United States Patent [19]
Bower

[11] 3,809,367
[45] May 7, 1974

[54] TRACTOR HOIST
[76] Inventor: Clayton G. Bower, R.F.D. 2, Republic, Ohio 44867
[22] Filed: Nov. 24, 1972
[21] Appl. No.: 309,216

[52] U.S. Cl. .................................. 254/144, 214/1 A
[51] Int. Cl. ........................................... B66c 23/60
[58] Field of Search ............... 254/139, 139.1, 144; 214/1 H, 1 D, 1 R, 1 A, 318, 46.34

[56] References Cited
UNITED STATES PATENTS

| | | | |
|---|---|---|---|
| 1,355,690 | 10/1920 | Rasmussen | 214/1 A X |
| 3,142,397 | 7/1964 | Felts | 214/318 X |
| 1,351,225 | 8/1920 | Barlow | 254/144 X |
| 3,520,514 | 7/1970 | Evans | 254/139 |
| 1,355,479 | 12/1920 | Jackson | 214/1 A X |
| 1,259,942 | 3/1918 | Weaver | 214/1 A X |
| 2,567,672 | 9/1951 | Lawless | 214/1 A |

*Primary Examiner*—Frank E. Werner
*Attorney, Agent, or Firm*—Hamilton, Renner & Kenner

[57] ABSTRACT

A hoist having laterally spaced L-shaped frame elements connected by upper and lower cross bars, one upper cross bar being a rotatable shaft. Reeling cables or the like attached to the shaft have detachable clamping means to connect to the front wheels of a tractor positioned within the frame with its rear wheels abutting a lower transverse connector bar for tilting the tractor upwardly about the rear wheels.

8 Claims, 4 Drawing Figures

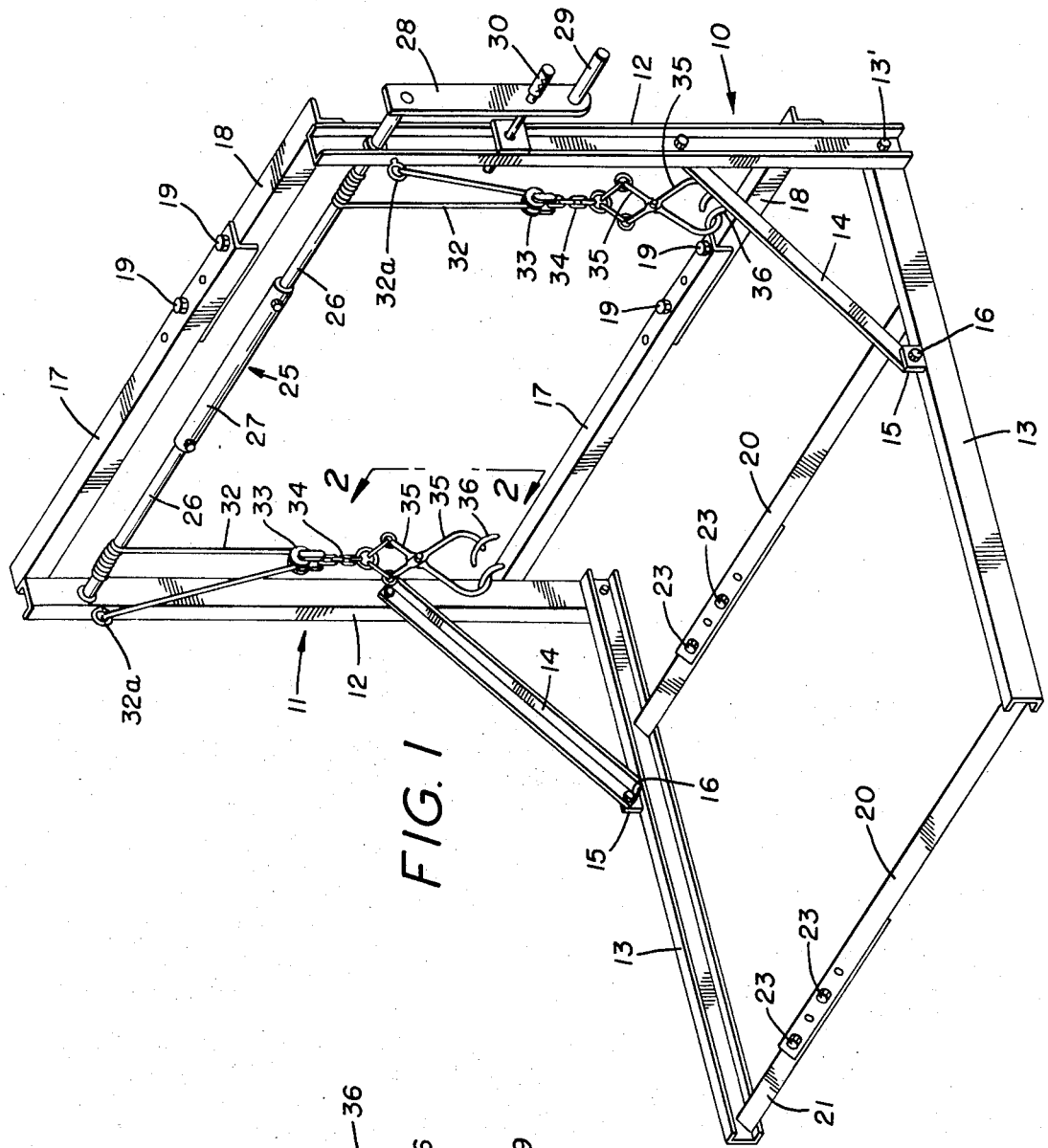
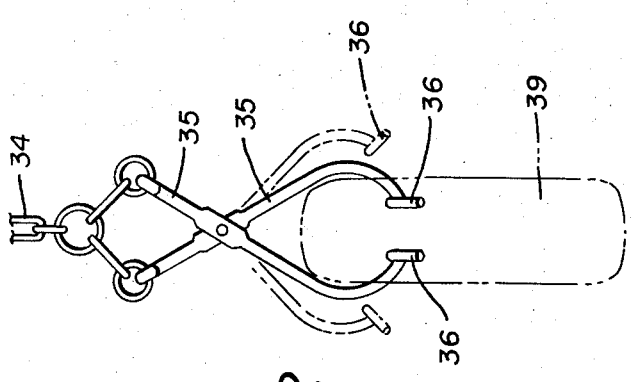

TRACTOR HOIST

BACKGROUND OF THE INVENTION

The widespread current use of small tractors around the yard and in small plots of ground for mowing, gardening and the like, has made it desirable for the home owner to repair and maintain his tractor, including changing attachments, sharpening and replacing cutting blades, etc. This usually requires access to the underside of the tractor, and the home owner seldom has the facility of a relatively expensive power hoist in his garage or tool shed, so that the repair and maintenance of his tractor is extremely difficult and frequently hired and expensive.

Prior hoists of which I am aware have been much too complicated and expensive to be practicable for the home owner, and are not designed or adapted to be used with small tractors. For example, one prior construction discloses a portable truck dump which has an L-shaped frame with lifting cables attached to a rotatable top shaft but the cables are attached at their outer ends to lifting arms which are adapted to engage under the axle of a truck after the horizontal part of the portable frame has been positioned under the truck and the lifting arms partially raised manually to engage the axle. Obviously, such a dump would not be practicable for garden tractors. Among other things the axle design of such tractors varies so that the lifting arms would not fit some designs. Also, making the portable frame small enough to pass between the tractor wheels would not be feasible.

SUMMARY OF THE INVENTION

It is a general object of the present invention to provide a novel and improved hoist adapted for lifting one end of a tractor to make its underside accessible for maintenance or repair.

A more specific object is to provide an improved tractor hoist which does not require positioning lifting elements under the tractor.

A further object is to provide an improved tractor hoist within which a tractor can be driven to tilting position where lifting cables are quickly attached to the front wheels to tilt the tractor upwardly around the rear wheels.

Another object is to provide an improved tractor hoist which is adjustable to fit different sizes of tractors.

A still further object is to provide an improved tractor hoist which is simple and inexpensive to construct and easily operated by unskilled persons with a minimum of time and effort.

These and other objects are accomplished by the improvements comprising the present invention, a preferred embodiment of which is shown by way of example in the accompanying drawings and described in detail in the following specification. Various modifications and changes in details of construction are comprehended within the scope of the appended claims.

BRIEF DESCRIPTION OF THE DRAWINGS

FIG. 1 is a perspective view of the improved tractor hoist.

FIG. 2 is an enlarged elevational view on line 2—2 of FIG. 1 showing one of the clamping means on the outer end of one of the lifting cables.

DESCRIPTION OF A PREFERRED EMBODIMENT

Figure 3:
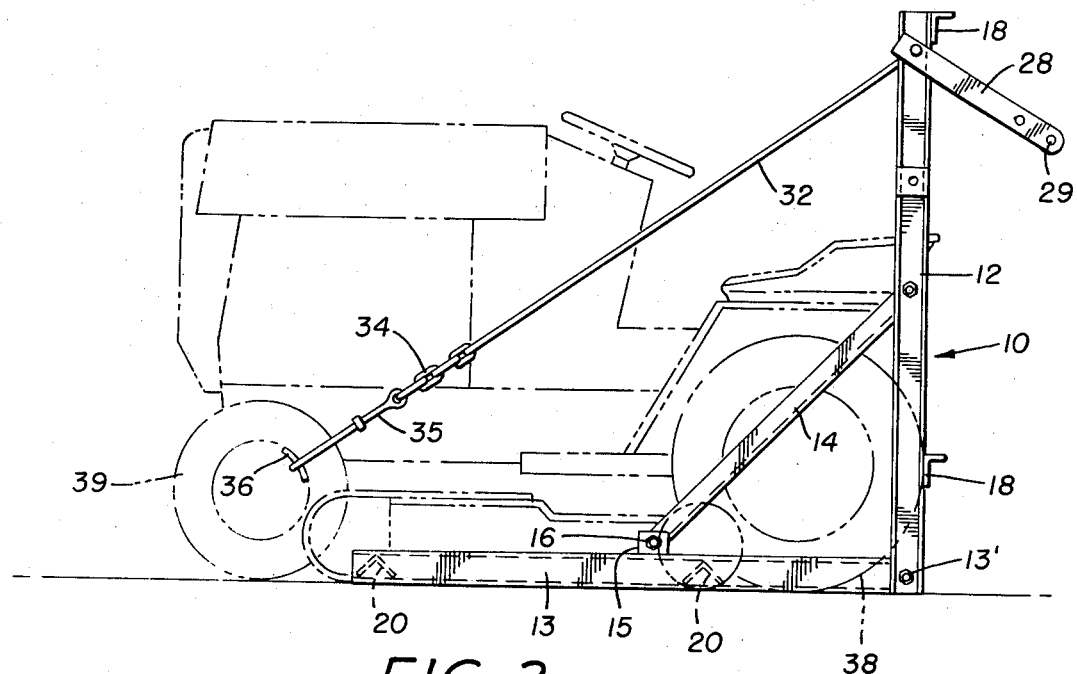
FIG. 3 is a side elevation of the improved hoist showing in phantom lines a tractor in position to be tilted upwardly.

The improved hoist preferably comprises laterally spaced L-shaped frame members indicated generally at 10 and 11. The frame members have vertical components 12 and horizontal components 13. The components 12 and 13 may be channels as shown, the channels 13 being attached at one end to the bottom of the respective channels 12, as by bolts 13' or the like. Preferably, diagonal braces which may be angles 14 connect the channels 12 and 13 to maintain them in right angled relation to each other, the braces 14 being bolted at their upper ends to the webs of vertical channels 12 and bolted by bolts 16 at their lower ends to bracket lugs 15 welded to the top legs of horizontal channels 13.

The L-shaped frame members 10 and 11 are adjustably connected in laterally spaced relation by cross bars. At their upper ends and adjacent their lower ends the vertical channels 12 are connected by transverse bars having telescopically adjustable angle bars 17 and 18 connected by bolts 19 positioned selectively in registering holes in the overlapping portions of the angle bars, the ends of the angles 17 and 18 being welded to the respective channels 12.

Similarly, the horizontal channels 13 are adjustably connected in laterally spaced relation by cross bars at their outer ends and adjacent their inner ends by transverse bars having telescopically adjustable angle bars 20 and 21 connected by bolts 23 positioned selectively in registering holes in the overlapping portions of the angle bars, the ends of the angle bars 20 and 21 being welded to the respective channels 13.

Another cross bar which connects the vertical channels adjacent their upper ends comprises a shaft 25 having its end portions 26 journaled in the webs of channels 12, the end portions 26 being telescopically adjustable in the medial portion 27 of shaft 25. One end portion 26 projects beyond the respective channel 12 and may have a crank 28 thereon with a handle 29 on its outer end for rotating shaft 25. A latch pin 30 may be provided for selective positioning in registering holes in the crank 28 and adjacent channel 12 to hold the crank 28 and shaft 25 in inoperative position. Obviously, a worm gear drive may be used for rotating shaft 25, in which case a worm gear would be secured on the shaft end portion and the crank would rotate a worm meshing with the worm gear.

Each shaft end portion 26 has one end of a cable 32 attached thereto and intermediate portions of the cables pass around pulleys 33 with the outer ends of the cables secured at 32a to the upper ends of channels 12. The pulleys 33 are pivotally mounted on one end of links 34 connected at their other ends to the ends of ice tong levers 35. The levers 35 comprise clamping means for connection to opposite sides of the wheel rims at the front end of a garden tractor as indicated in phantom lines on the drawing. For this purpose, the outer ends of the levers 35 have curved bars or shoes 36 for clamping against the wheel rims.

Figure 4:
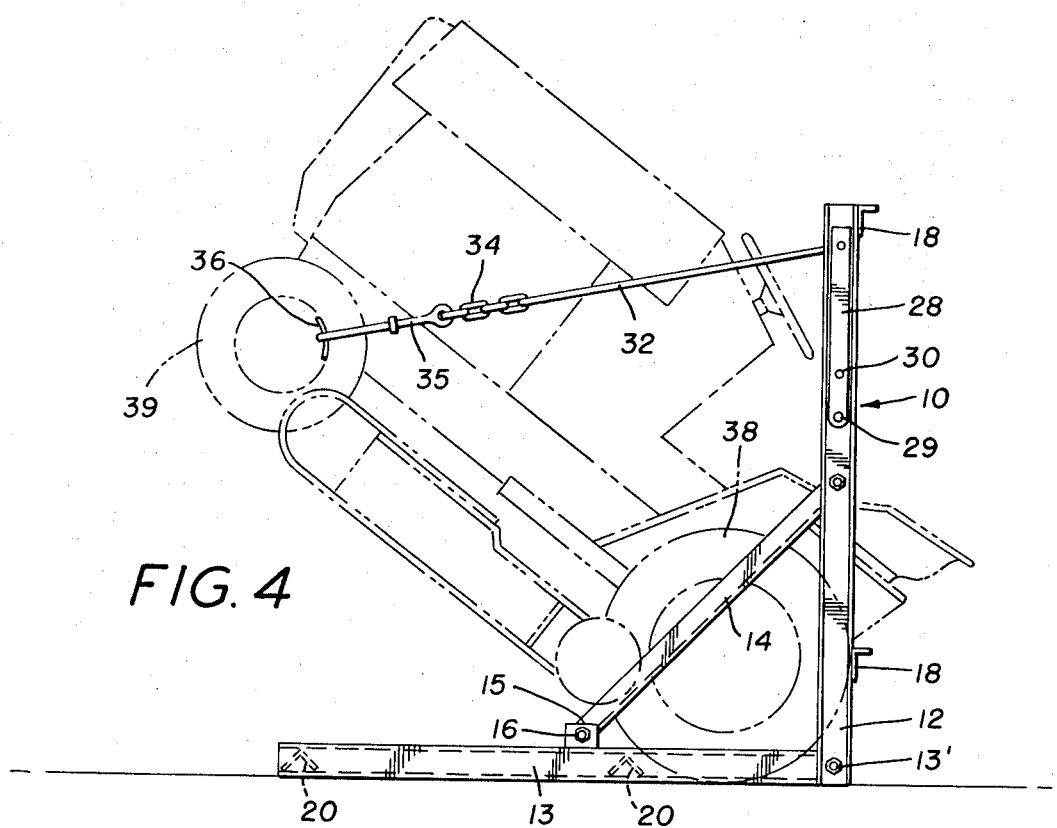
FIG. 4 is a similar view showing the tractor in upwardly tilted position.

In the operation of the improved hoist the tractor is driven between the L-shaped frame members 10 and 11, preferably by backing the tractor therein until the rear wheels 38 of the tractor roll over the inner cross bar 20,21 and abut the lower cross bar 17,18, in the phantom position of FIG. 3. The clamping means 35 are then attached to the rims of the front wheels 39, and by manually turning the crank 28 to reel in or wrap the cables 32 around shaft portions 26, the front wheels 39 are raised to tilt the tractor upwardly about the rear wheels which are in abutment with the lower cross bar 17,18, as shown in FIG. 4. If the tractor is tilted to near vertical position, any tendency of the rear wheels to roll forwardly is prevented by abutment of the rear wheels with inner bar 20,21. Obviously, the position of the tractor can be reversed so that the clamping means 35 can be attached to the rear wheels to tilt the tractor upwardly around the front wheels.

It will be apparent that the improved hoist is simple and inexpensive, easily operated to make the underside accessible for maintenance and repair and does not require positioning lifting elements under the tractor which can be driven into lifting position within the frame elements. Moreover, the width of the frame is easily adjustable to accommodate various sizes of tractors.

Moreover, by removing bolts 16, the channels 13 can be pivoted on bolts 13' to fold them within the vertical channels 12, thereby collapsing the frame for convenient storage.

I claim:

1. A tractor hoist having a base, laterally spaced frame members extending upwardly from said base, upper and lower transverse bars connecting said frame members, said lower bars positioned to extend above said base, means for axially rotating said upper bar, laterally spaced flexible linear connectors attached at one end to said upper bar, detachable clamping means on said linear connectors for attachment to the wheels at one end of a tractor positioned within the frame members with the wheels at its other end abutting said lower transverse bar, whereby rotating said upper bar will reel in the linear connectors and tilt the tractor upwardly about the wheels at said other end of the tractor.

2. A tractor hoist as described in claim 1, in which said tractor wheels to which said linear connectors are attachable are the front wheels.

3. A tractor hoist as described in claim 2, in which said transverse bars are axially adjustable.

4. A tractor hoist as described in claim 2, in which the frame members have vertical and horizontal components and said horizontal frame components are connected by a transverse bar positioned to prevent the rear wheels from rolling forwardly.

5. A tractor hoist as described in claim 1, in which said transverse bars are axially adjustable.

6. A tractor hoist as described in claim 1, in which the frame members have vertical and horizontal components and said horizontal frame components are connected by a transverse bar positioned to prevent the wheels abutting said lower transverse bar from rolling forwardly.

7. A tractor hoist having laterally spaced frame members embodying vertical and horizontal components, upper and lower transverse bars connecting said frame members, another transverse bar connecting the horizontal components, means for axially rotating said upper bar, laterally spaced flexible linear connections attached at one end to said upper bar, detachable clamping means on said linear connectors for attachment to the wheels at one end of a tractor positioned within the frame members with the wheels at its other end abutting said lower transverse bar, whereby rotating said upper bar will reel in the linear connectors and tilt the tractor upwardly about the wheels at the other end of the tractor, all of said transverse bars being axially adjustable.

8. A tractor hoist as described in claim 7, in which said tractor wheels to which said linear connectors are attached are the front wheels.

* * * * *